United States Patent [19]

Kitai

[11] 3,842,425

[45] Oct. 15, 1974

[54] APPARATUS ENLARGING THE RANGE OF EXPOSURE TIME CONTROL

[75] Inventor: Kiyoshi Kitai, Tokyo, Japan

[73] Assignee: Kabushiki Haisha Hattori Tokerten, Tokyo, Japan

[22] Filed: June 4, 1973

[21] Appl. No.: 366,277

Related U.S. Application Data

[63] Continuation of Ser. No. 168,216, Aug. 2, 1971, abandoned.

[30] Foreign Application Priority Data

July 31, 1970 Japan .............................. 45-66507

[52] U.S. Cl. ......................... 354/51, 354/45, 354/49

[51] Int. Cl. ............................................. G01j 1/46

[58] Field of Search ........... 95/10 C, 10 CT, 10 CE, 95/64 R, 64 D

[56] References Cited

UNITED STATES PATENTS

| | | | |
|---|---|---|---|
| 3,433,140 | 3/1969 | Wick et al. | 95/10 CT |
| 3,599,547 | 8/1971 | Wagner | 95/10 C |
| 3,643,561 | 2/1972 | Numata | 95/10 CT |

*Primary Examiner*—Samuel S. Matthews
*Assistant Examiner*—Russell E. Adams, Jr.
*Attorney, Agent, or Firm*—Robert E. Burns; Emmanuel J. Lobato; Bruce L. Adams

[57] ABSTRACT

A built-in exposure time control apparatus for a camera shutter in which a detector detects whether the brightness of the subject being photographed is above or below a given brightness level. An exposure time control circuit develops an exposure time control signal used to close a camera shutter and having a delay in dependence upon the brightness of the subject being photographed. The delay is determined by circuitry that memorizes a voltage representative of the brightness and extends the delay under control of the detector if the brightness detected is below the given brightness level. The delay extension is accomplished by placing in circuit an additional memory extending the range of the memory circuit thereby extending the range of possible exposure time control. The detector determines whether the brightness detected is above or below the given level to determine the necessity of extending the range of the delay. The delay is made by varying mechanical limits or determinations of possible movements of a mechanical member as a function of the brightness being sensed by a photoconductive element. The detector can also make the determination electronically with a transistor functioning as a comparator comparing a predetermined voltage, set by a voltage divider, with a varying voltage proportionate to the brightness of the subject being photographed and determined by the photoconductive element. The electronic comparator determines according to the comparison of the voltages whether the delay is to be extended by placing in circuit the necessary additional memory and delay elements.

6 Claims, 6 Drawing Figures

APPARATUS ENLARGING THE RANGE OF EXPOSURE TIME CONTROL

This is a continuation, of application Ser. No. 168,216, filed Aug. 2, 1971 now abandoned.

BACKGROUND OF THE INVENTION

This invention relates generally to cameras and more particularly to exposure time control apparatus for camera shutters.

DESCRIPTION OF THE PRIOR ART

Exposure time control devices are known for use in cameras, for example TTL type cameras, which detect the brightness of the field or subject being photographed and are provided with a photoelectric or photoconductive element arranged in the path of the photographing lens so that the light is sensed and an electrical quantity or charge is developed corresponding to the detected value of the light brightness. This charge is memorized and is used to accurately control exposure time automatically as a function of the brightness of the subject or field being photographed even if the detection of the brightness is interrupted during the shutter operation. These known devices, however, are limited as to the range of exposure time that they can control over the range of variations of possible brightness of the subjects photographed.

SUMMARY OF THE INVENTION

It is a principal object of the invention to provide an exposure time control apparatus in which the range of exposure time control, as a function of the brightness of the subject being photographed, is enlarged.

Another object is to provide an exposure time control apparatus in which the exposure time range of a camera shutter is expanded by memorizing a signal corresponding to a detected value of brightness of a subject being photographed and in conjunction therewith applying an additional memory delay to the signal, which is in the form of an electric charge, for expanding the range of the exposure time when the brightness of the subject being photographed is below a given level and the signal level is correspondingly reduced.

In accordance with the built-in exposure time control device or apparatus of the invention a detector comprising a plate, having an iris thereof cooperative with a camera release lever and light-responsive circuitry, detects the brightness of a subject of the photograph being taken thereof and as a function of a predetermined level of this detected brightness, set by the detector, allows the detection plate to move a magnitude which is determined as a function of whether the detected brightness is above or below the predetermined brightness level. If the brightness of the subject is less than the predetermined level the exposure time is expanded by the detector allowing the plate thereof to move a greater mechanical distance such that the detector places in circuitry in an exposure time control circuit of the apparatus elements to develop a greater delay in the circuit for expanding the exposure time and the plate displaces the iris from a beam of light passing through the camera lens and impinging on a photoconductive element in the light-responsive circuitry. The delay is accomplished by memorizing in a memory or capacitor a first charge corresponding to a detected brightness level and placing in circuit a second capacitor or memory device that is charged and coacts with the memory in determining the exposure time when the brightness is below the predetermined or given level.

An embodiment of the invention establishes a brightness reference level electronically rather than mechanically with a plate. An electronic comparator is provided in the electronic detector, which in this second case, is a detecting circuit, which compares a given voltage determined by a voltage divider and a varying voltage representative of and proportionate to the detected brightness of the subject being photographed.

BRIEF DESCRIPTION OF THE DRAWINGS

Other objects and advantages of the exposure time control apparatus according to the invention will appear from the following description of an example of the invention and the novel features will be particularly pointed out in the appended claims and drawings in which:

DESCRIPTION OF THE PREFERRED EMBODIMENTS

Figure 1:
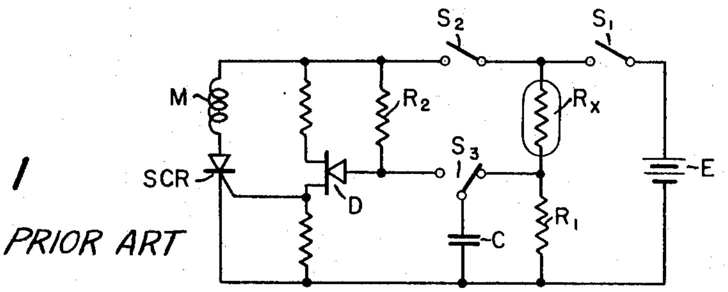
FIG. 1 PRIOR ART
FIG. 1 is a schematic of a known exposure time control circuit.

Exposure time control devices or circuits are known of the type illustrated in FIG. 1 in which a light-responsive photoelectric element $R_x$ and a series resistor $R_1$ are disposed in a voltage divider configuration across a power source E. The photoelectric element and resistor in series therewith are in series with a power switch $S_1$ which is closed when the camera release button is depressed, not shown. When the power switch is closed a precharging circuit is formed in which a capacitor C in parallel with the series resistor $R_1$ is preliminarily charged to a partial capacity or level corresponding to the brightness of the light received by the photoelectric element $R_x$ from a beam of light passing through the camera lens, for example a TTL type camera. The circuit is provided with a series switch $S_2$, and a change-over switch $S_3$ as shown. The series switch $S_2$ closes and places in circuit a resistor $R_2$ in series with the capacitor C as the change-over switch $S_3$ is shifted over at the same time. These two switches close as the shutter is operated to the open position shortly after closing of the power switch $S_1$. The charge on the capacitor C is additionally increased through the second resistor $R_2$ and when its voltage charge reaches a value corresponding to the brightness of the subject being photographed the shutter will be closed by a trigger signal applied to a switch circuit comprising a double diode D in series with two resistors across the power source and an SCR element and an operating coil M of an electromagnet of the switch circuit which is energized and closes the shutter. The trigger signal timing determines the proper exposure time.

A drawback of this well known circuit is that the exposure time range controlled, which is a function of the variations in brightness of the subject being photographed, is quite limited. The voltage precharged in the capacitor C in accordance with the brightness B of the photographed subject is indicated by the following equation:

$$V = E \cdot (R_1/R_x + R_1) \qquad (1)$$

When the bias voltage, a trigger level, in the switch circuit is assumed to be Vt then the capacitor charged by the preliminary charge voltage V is additionally charged through the resistor $R_2$ and the time T assumes the time Vt which corresponds to the trigger level of the trigger circuit. This condition is expressed as follows:

$$T = R2C1n\ (E - V/E - Vt)$$

From equation (1), the condition becomes:

$$T = R2C1n\ (E/E - Vt) \cdot (1/1 + R_1/R_x) \qquad (2)$$

Since T is substantially the exposure time, it should be inversely proportional to the brightness B of the subject being photographed. However, in general the relationship between the resistance value of the photoconductive element $R_x$ and the brightness B of the subject being photographed can be indicated by the following equation:

$$R_x = R_o \cdot B^{-\gamma} \qquad (3)$$

Where, $R_o$: is a proportional constant and $\gamma$: is a coefficient indicating the resistance characteristic of the photoelectric element Accordingly the exposure time T of equation (2) is not inversely proportional to the brightness of the subject matter being photographed even if the slope $\gamma$ of the photoelectric element is unity. The exposure time T is only approximately inversely proportional to the brightness within a narrow range of brightness of the subject being photographed so that the time exposure range in which the known circuit can operate for accurately controlling exposure time will be smaller than is desirable. Moreover, since photoelectric elements satisfying the equation (2) may exist it is not possible to increase the precharging voltage in the capacitor C to a value higher than the trigger voltage level Vt and if the precharge is decreased to too low a value then the exposure time accuracy will decrease so that the range of exposure time control cannot be increased.

In well known devices, other than that of FIG. 1, it is impossible to increase the range of exposure time control due to the inherent characteristics of the photoelectric elements used and the characteristics of the memory devices and other factors. The present exposure time control invention seeks to provide an apparatus which can control exposure time accurately over an extended range of variations of the brightness of the subject by means of a simple construction.

As will be seen hereinafter the apparatus in accordance with the invention obtains its desired results by use of a detecting device detecting the brightness level of the subject or field being photographed and determining whether it is higher or lower than a predetermined brightness level. A memory device or photographic subject brightness measuring device is rendered effective by the detecting device and is actuated according to the detected brightness value and an exposure time control switching circuit is switched in response to the memorized values of a voltage corresponding to the detected brightness.

Figure 2:
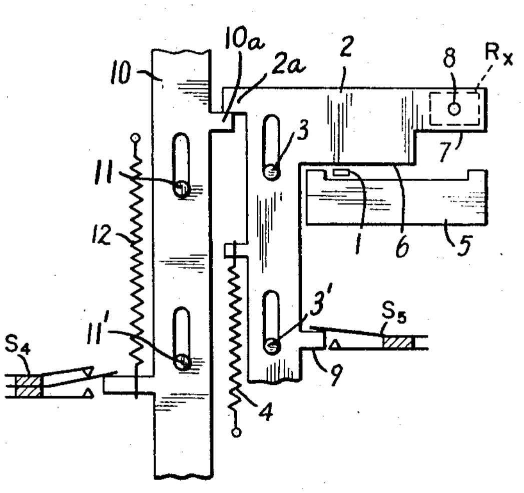
FIG. 2 is a diagramatic elevation view of a detection device of the exposure time control apparatus in accordance with the invention.
Figure 3:
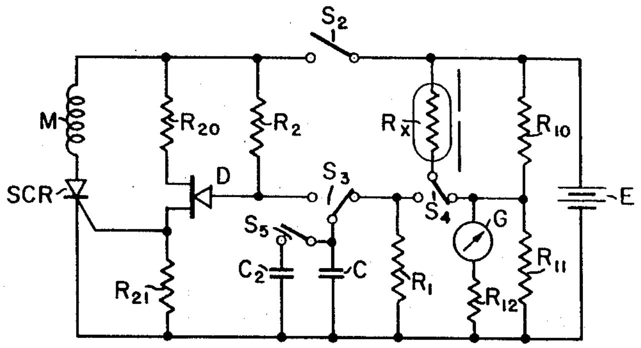
FIGS. 3 to 5 are circuit diagrams of exposure time control circuits used in conjunction with the detection device of FIG. 2.

A first embodiment of the invention is illustrated in FIGS. 2 and 3 wherein the reference numerals and letters correspond to those of FIG. 1 in order to more easily describe the invention with relation to the known circuits. In the invention a photoelectric or photoresponsive element $R_x$ corresponding to the photoelectric element of the known circuit is a photoconductive element, a CdS, arranged in the path of a beam of light passing through the photographic lens of a camera, not shown. The beam of light is the light entering the camera and the brightness of the subject matter being photographed is accordingly sensed. Within the exposure time control circuitry of the camera, as hereinafter described an ammeter, G having a needle 1 shown in cross section in FIG. 2, responds to the current in the control circuitry which is a function of the brightness of the subject being photographed as the resistance of the photoconductive element varies as a function of the brightness sensed. The needle 1 accordingly moves either to the right or to the left in dependence upon the brightness of the subject matter being photographed. The needle will move toward the left when the brightness of the subject is high and moves toward the right, in the drawing, when it is low. The needle 1 can cooperate with a scale on the finder of the camera, not shown indicating exposure time.

A detecting plate 3, of a detector, is movable upwardly and downwardly and is guided by fixed pins 3, 3′ in corresponding elongated slots in the plate as shown. The detecting plate is biased downwardly by a spring 4 in the direction of engagement with the needle 1 for engaging it to bear on a fixed plate 5. The plate is provided with stepped surfaces 6, 7 which as can be seen will allow the plate to move downwardly a lesser or greater distance depending upon whether the needle 1 underlies a surface 6 closer to it or the other surface 7 so that the downward movement of the plate is variable because of this stepped portion and the relative position of the needle 1. An iris 8 is carried by the detecting plate 2 in position for passing the beam of light incident on the photoelectric or photoconductive element $R_x$.

The detecting plate 2 is provided with a projection 9 functioning as a switch operating element cooperating with the contacts of a switch $S_5$ in a circuit later described, which is open when the camera is in readiness for taking an exposure or cocked as shown in FIGS. 2 and 3.

The detecting plate is controlled by a release plate 10 movable longitudinally upwardly and downwardly and guided by fixed pins 11, 11′ in corresponding elongated slots. A spring 12 biases the release plate upwardly engaging a projection 10a of the release plate with a shoulder 2a on the detection plate so that the force of the spring 4 is overcome and the detection plate is biased upwardly and held in a raised position against the downward force of its own spring 4. Thus it is possible for the needle 1 to move freely and variably according to the brightness of the light sensed in a slot formed between the sensing plate and the fixed plate 5. The release plate 10 likewise cooperates with the control circuit and is provided with a projection 13 which operates a change-over switch $S_4$ so that its movable contact is in contact with a stationary contact as illustrated and operative as hereinafter described. The switch $S_4$ is in the condition shown in FIG. 3 when the camera is in readiness for taking an exposure.

An electronic exposure control circuit in accordance with the invention, and used with the detection device in FIG. 2, is illustrated in FIG. 3. The circuit illustrated has a voltage divider $R_{10}$, $R_{11}$ across a power source E and the ammeter G is connected to a junction between the resistors of the voltage divider in series with a resistor $R_{12}$ and is connected to the power source E through the change-over switch $S_4$ and the photoconductive CdS cell or photoconductive element $R_x$ in series therewith forming a detector in conjunction with the plate 2, the needle 1 and the fixed plate 5. The voltage dividing resistors $R_{10}$, $R_{11}$ and the series resistor $R_{12}$ provide a corrective device for correcting for the characteristics of the ammeter G.

With the circuit as shown the ammeter has the needle 1 disposed in accordance with the level of the brightness of the subject being photographed. The needle and plate jointly define, under control of the photoconductive element, a predetermined brightness level and the detected brightness level. When the detected brightness is above the given or predetermined level the closer surface 6 of the detecting plate 2 engages the needle 1 and moves it against the upper surface of the fixed plate. The vertical surface between the stepped surfaces 7 forms a brightness level determiner and defines exactly the predetermined brightness level. The three surfaces define a comparator as will be seen hereinafter. When the brightness of the subject being photographed is below the given brightness level determined by the detector the needle is disposed underlying the detector plate step more remote surface 7 and the detector plate can move more downwardly before the needle 1 is engaged and held thereby against the fixed plate 5. The detector plate not only determines a predetermined or given brightness level but also acts as a comparator which compares the brightness detected with the given brightness level and operates to extend the range of brightness detected, and accordingly extends the range of exposure time control, by placing in circuitry an additional time delay as later explained.

When the release lever or button of the camera, not shown, is activated for taking a photographic exposure the release plate 10 is activated and the change-over switch $S_4$ is switched over and a resistor $R_1$ is connected to the power source E through the photoelectric element $R_x$. A capacitor C connected in parallel to the resistor $R_1$ through the change-over switch 4 is preliminarily charged under control of the photoconductive element. A second change-over switch $S_3$ is in the position illustrated in FIG. 3 so that the preliminary charge is possible. As the release lever 10 and mechanism, not shown, associated therewith open the shutter simultaneously therewith this second change-over switch $S_3$ is shifted and an open power switch $S_2$ is closed so that a resistor $R_2$ is placed in circuit with the capacitor C and an additional charge is applied to the capacitor. The release plate 10 and detector plate 2 will shift over the switches and carry out a brightness level comparison as before described. If the brightness is greater than the given brightness level determined by the detector then only a single memory or comparator will apply a trigger signal to a double diode D, in series with base resistors $R_{20}$, $R_{21}$ across the power source and the signal passes through a rectifier SCR and an operating coil M of an electromagnet closing the camera shutter, not shown, with the proper exposure time determined.

The switch $S_5$ is in an open position and is allowed to be closed by the detector plate 2 when the detector plate detects that additional exposure time is required, when the brightness is below the given level, which is represented by movement of the needle 1 to a position underlying the more remote surface 7 allowing the detecting plate to move downwardly and the $S_5$ switch to close. This places the second memory or capacitor $C_2$ in parallel with the other capacitor C and a resistor $R_2$ allowing an additional charge to be applied to the circuit by charging of the capacitor $C_2$. When the voltage charge reaches a given level corresponding to the reduced brightness the double based diode and the SCR will allow energization of the electromagnet coil M which actuates the shutter, not shown, to a closed position.

As indicated heretofore a magnification or expansion of the exposure time or increase thereof takes place so that proper exposures can be taken when the brightness is reduced. Thus when the brightness of the element or subject matter being photographed is lower than the predetermined level the remote step surface 7 of the detecting plate allows the detecting plate to move more downwardly and the plate in moving down moves the iris 8 from the front of the photoelectric element or cadmium sulfide cell $R_x$ so that the quantity of light incident on the photoelectric element will increase and as indicated heretofore switch 5 is closed. The operation of the circuit once the additional switch 5 has closed is the same as when the brightness of the subject matter is higher than a predetermined level but since another capacitor has been placed in parallel to the capacitor C the time constant of the circuit is increased when both capacitors C, $C_2$ are charged through the resistor $R_2$. And even though there has been a preliminary charging voltage applied which is the same as when the brightness of the photographed subject is high the exposure time is increased. The magnification or increase δ can be indicated by the following equation:

$$\delta = (C + c_2/C) \quad (4)$$

where, C, $C_2$: are the capacity of the individual capacitors. Therefore, iris 8 in front of the photoelectric element $R_x$ must be set to satisfy the following equation:

$$\delta = Q_2/Q_1 \quad (5)$$

where, $Q_1$: is the quantity of light passing through iris 8

$Q_2$: is a quantity of incident light in case of no iris before the photoconductive cell.

Figure 4:
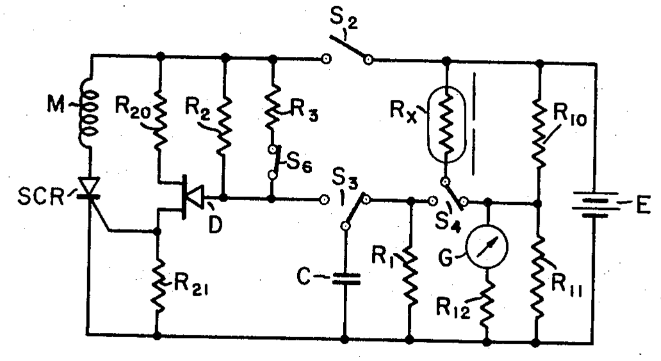

In the above described embodiment the additional capacitor $C_2$ is placed in circuit when the brightness of the subject matter is lower than a predetermined level but the same can be accomplished by modifying the circuit as illustrated in FIG. 4. In this instance the circuitry is substantially the circuit of FIG. 3 and the corresponding elements have the same reference numerals. However, in this instance the second capacitor $C_2$ and its associated switch $S_5$ are not in the circuit and instead an additional resistor $R_3$ and a closed switch $S_6$ in series therewith are placed in parallel with the resistor $R_2$ across the terminals of the power switch $S_2$ and the change-over switch $S_3$.

In this modified circuit the additionally added switch $S_6$ is arranged to be opened by the detector plate when the brightness of the subject matter is lower than the predetermined level. The circuit functions to increase the exposure time delay as before described. The exposure time increase and relationship between the charge controlling resistors $R_2$ and $R_3$ is set forth in the following equation:

$$\delta = 1 + R_2/R_3 \quad (6)$$

where $R_2$, $R_3$: are the resistance values of the corresponding resistors.

In this instance, as in the embodiment of FIG. 3, when the detector or detection plate 2 moves downwardly the iris is removed from the path of the light applied to the photoconductive element and the additional charge applied provides an expansion of the exposure time as before explained.

Figure 5:
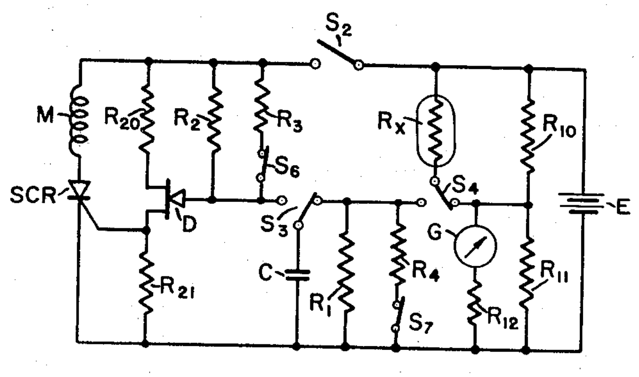

Both of the circuits in FIGS. 3 and 4 are usable with the device of FIG. 2 and a third embodiment of the control circuit is possible without iris switching; see FIG. 5 in which the reference numerals of the corresponding elements correspond to those of FIG. 4. In this instance the circuit of FIG. 4 is modified by provision of an additional resistor $R_4$ in series with a switch $S_7$ in parallel with the capacitor C and its associated parallel resistor $R_1$. In this instance the additional switch $S_7$ is likewise closed when the camera is in readiness for operation.

The additional switch $S_7$ as shown in FIG. 5 is opened by the detecting plate 2 when the brightness of the subject matter is lower than a predetermined level and the circuit time constant is increased so that the exposure time delay is increased and the circuit functions as before described. In this case exposure time increase and the time constant resistors $R_1$, $R_4$ have a relationship as set forth in the following equation:

$$\delta = 1 + R_1/R_4$$

Where $R_1$, $R_4$ each correspond to the resistance values of the corresponding resistors.

Figure 6:
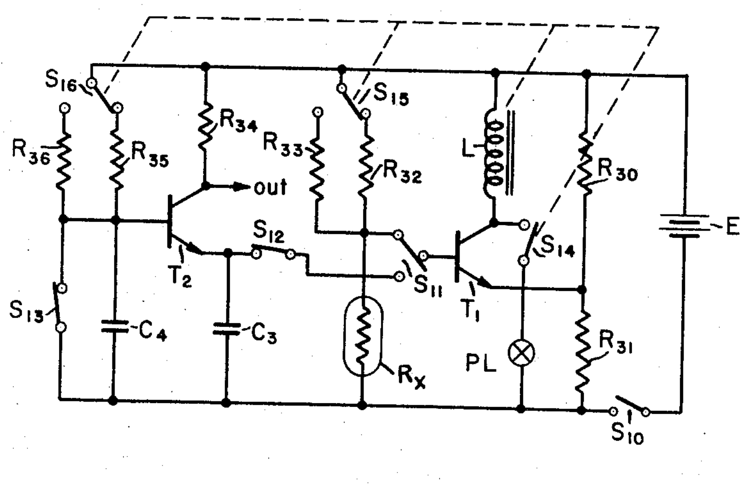
FIG. 6 is a circuit diagram of a second type of embodiment of the apparatus of the invention having an electronic comparator in a built-in electronic detection device thereof.

In the detection device, heretofore described the ammeter has been used to detect the brightness of the subject matter being photographed and controls the detection plate which actuates the circuitry as before described. However, a detector circuit detecting electronically the brightness of a photographed subject and electronically comparing the detected brightness and a predetermined brightness level can be provided in the invention as illustrated in the embodiment of FIG. 6. In this circuit a voltage divider constituting two resistors $R_{30}$, $R_{31}$ are connected across a power source E and a power switch $S_{10}$ is provided. A first or comparator transistor $T_1$ has its emitter connected to a junction between the two resistors of the voltage divider and its collector connected to an operating coil L of a relay that operates switches as later described. The relay coil is connected to the positive terminal of the battery E. The collector is connected to a stationary contact of an open switch $S_{14}$ in series with a light PL connected to the negative terminal of the power source E. The base of the comparator transistor $T_1$ is connected to a stationary contact engaged by the movable contact of a change-over switch $S_{11}$ which has its movable contact connected to a junction connected to a dividing circuit across the power source constituting the photoconductive element $R_x$ and a series resistor $R_{32}$, in series with another change-over switch $S_{15}$ changed over when the camera is taking an exposure. The other stationary contact of the second change-over switch $S_{15}$ is in series with a resistor $R_{33}$ connected to to a junction of the movable contact of the first change-over switch $S_{11}$ and the resistor $R_{32}$ in series with the cell $R_x$.

A second transistor $T_2$ is connected with its collector connected to a resistor $R_{34}$ connected to the positive terminal of the battery and the emitter thereof is connected to a capacitor $C_3$ at a junction at which another closed switch $S_{12}$ is connected in series with the terminal of the first-mentioned change-over switch $S_{11}$. The capacitor $C_3$ is connected to the negative terminal of the battery. A third switch of the switches interconnected and operated by the relay L is a third change-over switch $S_{16}$ which connects across the battery a resistor $R_{35}$ in series with a capacitor $C_4$ or when changed over a resistor $R_{36}$ in series with a sixth switch $S_{13}$ connected to the negative terminal of the battery.

The detecting circuit of the exposure control circuit heretofore described is comprised of the first or comparator transistor $T_1$, the operating coil L, power switch $S_{10}$, resistors $R_{30}$, $R_{31}$, $R_{32}$, pilot light PL, photoconductive element $R_x$, change-over switch $S_{11}$, and the switches $S_{14}$, $S_{15}$ which are operated by the relay. It will be noted that three switches $S_{14}$, $S_{15}$, $S_{16}$ are interconnected and operated by the relay L.

When the release plate 10, is depressed or actuated the power source switch $S_{10}$ is closed. The voltage from the power source E is divided by the photoelectric element and its series resistor $R_{32}$ and impressed on the base of the first transistor. On the other hand the voltage from the voltage divider $R_{30}$, $R_{31}$ is applied to the emitter of the first transistor $T_1$ so that the desired voltage comparison can be made. Thus when the base voltage is higher than the emitter voltage current flows through the collector to energize the relay operating coil L to operate the switch $S_{14}$, change-over switch $S_{15}$ and a third change-over switch $S_{16}$. Consequently the pilot light is energized by current flow through the relay coil L and the switch $S_{14}$. This constitutes a condition in which the brightness is below the given level. When the brightness of the subject matter being photographed is higher than the predetermined level the base voltage is lower than the emitter voltage so that the relay coil will not be energized and will not operate and the pilot light PL will not light. Thus the predetermined level of the brightness of the photographed subject depends upon the resistance values of the divider resistors $R_{30}$ and $R_{31}$.

As the release button of the camera, not shown, is pushed downwardly further in its movement the first change-over switch $S_{11}$ is actuated away from the position shown as that the voltage, corresponding to the detected brightness, applied to the base of the comparator transistor $T_1$ is removed and this transistor is rendered non-conductive. Once current flows to the relay coil L, in case the brightness of the subject matter being photographed is lower than the predetermined level, however, the electric circuit energizing the pilot light is formed by operation of the switches 14 so that the change-over switch $S_{11}$ is switched as described above and the relay coil L is still kept energized even when the transistor $T_1$ is rendered non-conductive.

The exposure time control circuit is formed of a change-over switch $S_{15}$, resistor $R_{32}$, photoelectric element $R_x$, the second transistor $T_2$, resistors $R_{33}$, $R_{34}$, $R_{35}$ and $R_{36}$, capacitors $C_3$ and $C_4$, switches $S_{12}$, $S_{13}$ closed at the start of operation of the shutter, and the change-over switch $S_{16}$ operated by the relay L. Thus a control signal can be generated in the collector of the second transistor $T_2$ is applied by the connection labelled "out" to operate an electromagnet for closing the shutter. As before described the switch $S_{11}$ is switched over by manipulation of the release button of the camera after detection of the brightness of the subject matter then the capacitor $C_3$ is charged to a voltage depending upon the photoelectric element resistance change and the resistance of its series resistors $R_{32}$ or $R_{33}$ for developing the delayed control signal controlling the expŏsure time. When the brightness of the subject matter being photographed is higher than a predetermined level the resistor $R_{32}$ is used. When it is lower than the predetermined level the resistor $R_{33}$ is used.

In the case of a single lens reflex camera when the release button is depressed and the mirror of the camera moves upwardly simultaneously therewith the closed switch $S_{12}$ is opened by mechanism, not shown, and an incident beam of light on the photoconductive element $R_x$ is cut off. As the mirror completes its rising movement the shutter begins to open in synchronization therewith and at the same time the switch $S_{13}$ is opened so that the capacitor $C_4$ is charged through charge control resistors $R_{35}$ or $R_{36}$. In this case if the brightness of the subject matter is higher than a predetermined level the charge control resistor $R_{35}$ is used while if it is lower the charge control resistor $R_{36}$ is placed in circuit.

When the base voltage of the second transistor $T_2$, which is the charging voltage of the capacitor $C_4$, becomes higher than the emitter voltage thereof, the memorized charge voltage of the capacitor $C_3$, the second transistor $T_2$ will be rendered conductive and its collector generates a signal by which the electromagnet, not shown, operating the shutter is closed.

The relationship among the change control resistors $R_{32}$, $R_{33}$ $R_{35}$ and $R_{36}$ and the delay increase can be determined by the following equality:

$$\delta = (R_{33}/R_{32}) = (R_{36}/R_{35})$$

where, $\delta$: is the magnification of the exposure time by switching over.

$R_{32}$, $R_{33}$, $R_{35}$ and $R_{36}$: are the resistance values of the corresponding resistors.

Those skilled in the art will recognize that the invention makes it possible to enlarge the controlling range of the exposure time corresponding to the brightness of subject matter being photographed and to improve its accuracy by use of a simple brightness detecting and comparator device in conjunction with exposure control circuitry.

What I claim is:

1. For use in a camera having a shutter, a built-in automatic exposure time control apparatus for controlling the exposure time of a shutter in a camera comprising, detector means having means detecting when in use the brightness of a subject being photographed and brightness-level determining means for determining whether the brightness of said subject is above a given level or below said given level, said detector means comprising a detecting circuit including a photoconductive element for sensing said brightness and said brightness-level determining means comprising a comparator comparing a given voltage and a variable voltage under control of said photoconductive element varying in dependence upon said brightness, signal-developing means coactive with said detector means developing an output signal for closing said shutter after opening thereof to determine exposure time comprising first means for determining the exposure time as a function of said brightness of said subject and second means connectable to said first means including capacitor means, said brightness-level determining means further including means for connecting said second means to said first means when said brightness is below said given level to augment said first means and to jointly therewith vary said output signal, and means receptive of said output signal for use as a command to close said shutter.

2. For use in a camera having a shutter, a built-in automatic exposure time control apparatus according to claim 1, in which said brightness-level determining means comprises an iris in a path of light from the subject being photographed to said photoconductive element, and means automatically displacing said iris from said light path when said brightness is below said given level.

3. In a camera having a shutter, light-responsive means sensing the brightness of a subject being photographed, detector means coactive with said light-responsive means determining whether said brightness is below or above a given brightness level, means including said light-responsive means developing an output signal for closing a shutter after opening thereof to determine exposure time, a trigger circuit means for closing a shutter upon application of said output signal, means memorizing said output signal, delay means including the last-mentioned means having a time constant delaying application of said output signal to said trigger circuit means to determine an exposure time as a function of whether said signal memorized is above said given brightness level and in accordance with the value of the memorized signal, time-constant-increasing means in said delay means controlled in dependence upon whether the detected brightness is below said given level for effectively increasing said time constant in conjunction with said means memorizing said output signal, and change-over means rendered effective by said detector means for rendering said time-constant-increasing means effective.

4. In a camera according to claim 3, in which said delay means comprises a circuit having a time constant, said light-responsive means comprising a photo-cell having a resistance varying in dependence upon the brightness of the subject being photographed, said means memorizing said output signal comprising capacitor means in said circuit charged at a rate dependent upon the resistance of said photo-cell, and said time-constant-increasing means controlled in dependence upon whether the detected brightness is below said given level comprising means to change the value of the capacitance of said capacitor means.

5. In a camera according to claim 4, including a current-measuring device responsive to current flow through said photo-cell, said device having a deflectable pointer moving to positions representative of the value of said current, means to selectively hold the pointer in a position to which it deflects, switch means in said circuit, and means for selectively operating said switch means to select the time constant of said circuit in dependence upon whether the deflected position in which said pointer is held corresponds to a current value above or below a predetermined value.

6. In a camera according to claim 3, in which said delay means comprises a circuit having a time constant, said light-responsive means comprising a charging circuit having a photo-cell having a resistance varying in dependence upon the brightness of the subject being photographed, capacitor means in said circuit charged at a rate dependent upon the resistance of said photo-cell, and said time-constant-increasing means controlled in dependence upon whether the detected brightness is below said given level comprising means to vary the resistance of said charging circuit.

* * * * *